(12) United States Patent
Madlener et al.

(10) Patent No.: US 7,946,595 B2
(45) Date of Patent: May 24, 2011

(54) TOOL HOLDER AND MEASURING SENSOR HAVING A TOOL HOLDER

(75) Inventors: Wolfgang Madlener, Ravensburg (DE); Wilfried Veil, Ravensburg (DE)

(73) Assignee: M & H Inprocess Messtechnik GmbH, Waldburg (DE)

( * ) Notice: Subject to any disclaimer, the term of this patent is extended or adjusted under 35 U.S.C. 154(b) by 0 days.

(21) Appl. No.: 12/721,617

(22) Filed: Mar. 11, 2010

(65) Prior Publication Data

US 2010/0164188 A1   Jul. 1, 2010

Related U.S. Application Data

(63) Continuation of application No. PCT/EP2008/007487, filed on Sep. 11, 2008.

(30) Foreign Application Priority Data

Sep. 11, 2007  (DE) .......................... 10 2007 043 030

(51) Int. Cl.
  *B23B 31/02*   (2006.01)
(52) U.S. Cl. ........ 279/157; 279/142; 279/158; 409/232; 356/623; 702/94
(58) Field of Classification Search .................. 279/142, 279/157, 158; 409/232, 234; 356/623, 631; 702/94
See application file for complete search history.

(56) References Cited

U.S. PATENT DOCUMENTS

| | | | | |
|---|---|---|---|---|
| 3,045,510 A | * | 7/1962 | Brainard ............................. | 408/3 |
| 5,018,915 A | * | 5/1991 | Inokuma et al. .............. | 409/231 |
| 5,140,739 A | * | 8/1992 | Yamaguchi et al. ............ | 483/18 |
| 6,260,858 B1 | * | 7/2001 | DeLucia ........................ | 279/102 |
| 6,339,868 B1 | * | 1/2002 | Nagaya et al. ................... | 29/447 |
| 6,370,789 B1 | * | 4/2002 | Madlener et al. ................ | 33/561 |
| 6,508,885 B1 | * | 1/2003 | Moslehi et al. ............... | 118/728 |
| 6,595,528 B2 | * | 7/2003 | Voss ................................ | 279/102 |
| 6,752,750 B2 | * | 6/2004 | Adachi et al. .................... | 483/31 |
| 6,887,019 B1 | * | 5/2005 | Gerber .......................... | 409/234 |
| 7,066,696 B2 | * | 6/2006 | Gerber .......................... | 409/234 |
| 2002/0094250 A1 | * | 7/2002 | Voss ................................ | 409/234 |
| 2008/0047155 A1 | | 2/2008 | Madlener et al. | |
| 2009/0155010 A1 | * | 6/2009 | Cook ............................ | 409/232 |
| 2010/0156054 A1 | * | 6/2010 | Sun et al. ...................... | 279/128 |

FOREIGN PATENT DOCUMENTS

| | | |
|---|---|---|
| DE | 199 23 164 A1 | 11/2000 |
| DE | 102 16 538 C2 | 7/2003 |
| DE | 103 48 568 A1 | 5/2004 |
| DE | 10 2006 039 258 A1 | 3/2007 |
| DE | 100 82 740 B4 | 5/2007 |
| JP | 59001128 A  * | 1/1984 |
| WO | 2006/043170 A2 | 4/2006 |

* cited by examiner

*Primary Examiner* — Eric A Gates

(74) *Attorney, Agent, or Firm* — Burr & Brown

(57) ABSTRACT

A tool holder, in particular for a measuring sensor, with an interface to a spindle of a machine tool is proposed. The tool holder comprises, as seen from the interface for the spindle, a material portion which differs from the customary basic material of a tool holder in a lower coefficient of linear expansion $\alpha$ and/or in a lower heat conductivity $\lambda$. According to the invention, the material portion affords thermal decoupling between the tool-side portion of the tool holder and a tool received therein from the tool spindle for reducing a length change on account of an introduction of heat coming from a comparatively hot tool spindle.

7 Claims, 1 Drawing Sheet

TOOL HOLDER AND MEASURING SENSOR HAVING A TOOL HOLDER

CROSS REFERENCE TO RELATED APPLICATIONS

This application is a continuation of International Application No. PCT/EP2008/007487 filed Sep. 11, 2008, which designated the United States, and claims the benefit under 35 USC §119(a)-(d) of German Application No. 10 2007 043 030.4 filed Sep. 11, 2007, the entireties of which are incorporated herein by reference.

FIELD OF THE INVENTION

The invention relates to a tool holder and a measuring sensor having a tool holder.

BACKGROUND OF THE INVENTION

A machine tool, for example for high-speed machining, such as high-speed milling, normally has what is known as a motor spindle possessing a rotating spindle shaft and a shaft housing in which the spindle shaft is mounted. At the huge rotational speeds of the spindle shaft during high-speed machining, this and also the shaft housing heat up. The stationary shaft housing of a spindle is therefore equipped with a cooling system.

However, the heat cannot be dissipated entirely by means of the cooling system. Heat is therefore introduced to the tool holder chucked in the tool spindle and to the tool fastened therein. In the event of a change of a tool holder, this, and likewise a tool, such as, for example, a measuring sensor, arranged therein, are initially at ambient temperature.

The "hot" spindle heats up the tool holder and an inserted tool. The result of this introduction of heat is that the tool holder and the tool are elongated. Insofar as such a change in dimension is not detected, it may have an adverse effect in a process step, for example measurement, in terms of the accuracy of the latter.

A linear expansion of the spindle is taken into account by being determined, for example, directly via temperature sensors.

SUMMARY OF THE INVENTION

The object on which the invention is based is to reduce the consequences of the flow of heat from a spindle to a tool holder.

The invention proceeds first from a tool holder for mounting a measuring sensor on a machine tool, with an interface to the machine tool. The tool holder comprises, as seen from the interface for the spindle, a material portion which differs from the customary basic material of a tool holder in a lower coefficient of linear expansion α and/or in a lower heat conductivity λ. The essential aspect of the invention is that the material portion affords thermal decoupling between the tool-side portion of the tool holder and a tool received therein from the tool spindle for reducing a length change on account of an introduction of heat coming from a comparatively hot tool spindle.

What can be achieved by this procedure is that the introduction of an undesirably large amount of heat into the tool holder does not occur at all or a thermal expansion, in particular elongation, remains comparatively insignificant. A change in dimension due to thermal expansion can consequently be reduced to an amount which is still acceptable for a machining task. For example, by means of the position, the dimensioning and the choice of material of the material portion, a thermal expansion of the tool holder from the interface as far as a tool under customary temperature conditions on motor spindles after the insertion of a tool holder is reduced to a value of <2 µm.

In an extreme case, the material portion comprises the complete tool holder, for example as far as a measuring sensor. That is to say, in such an embodiment, the tool holder consists entirely of a material with a lower coefficient of linear expansion and/or with a lower heat conductivity.

In a preferred refinement of the invention, the material portion has a coefficient of linear expansion α of <5 µm/mK and/or a heat conductivity λ of <11 W/mK. Conventional types of steel for a tool holder usually have a coefficient of linear expansion which lies between 12 µm/mK and 16 µm/mK. Thus, by means of a material portion according to the invention, a lower expansion can be achieved, while the introduction of heat remains the same. Moreover, an introduction of heat into a region following the material portion, for example into a measuring sensor, and into the material portion can be markedly delayed. Consequently, for example, a measuring sensor can perform a measuring task in a predetermined time span with an acceptable elongation, thus leading to high measuring accuracy.

In a preferred refinement of the invention, the material portion divides the tool holder. In order to avoid a disruptive introduction of heat, for example, into a measuring sensor, however, it may be sufficient that the material portion does not extend over the complete sectional plane of a tool holder, but only over a part region. Preferably, however, in the case of at least one continuous section through the tool holder transversely with respect to the tool holder axis, the material portion extends over more than 50% of a sectional plane projected in the axial direction.

An important parameter for an elongation of the tool holder is the point at which the material portion is located. If it is arranged comparatively far away in the tool holder, as seen from the interface, the material lying in front of it from the interface as far as the material portion has the possibility of expanding undesirably under the introduction of heat. It is therefore proposed, further, that the material portion be located at a distance from a surface of contact of the interface with a spindle which is such that the basic material of the tool holder still remains only in a thickness which is sufficient to provide a necessary inherent stability for the tool holder, particularly at the point of contact with the spindle. For example, from a point which lies at a distance A from a spindle nose of the tool spindle, the tool holder is made from the material which possesses a lower coefficient of linear expansion and/or a lower heat conductivity.

In order to achieve even more effective decoupling, the tool holder may as it were be "hollowed out" and filled with the material having a lower coefficient of linear expansion and/or a lower heat conductivity, designated below by decoupling material, the decoupling material also extending in a cross-sectional plane into the marginal region of the tool holder to an extent such that only a wall region of a predetermined thickness still remains which is sufficient to give the tool holder the necessary stability. For example, wall thicknesses of <10 mm with respect to the decoupling material remain at least on a cross-sectional surface (8 mm, 5 mm or even 3 mm are even better). The decoupling material may extend in the axial direction over a comparatively large region, for example over a length of 10 mm, 20 mm, 30 mm or even more. If appropriate, the decoupling material reaches as far as the measuring sensor.

In order to achieve a desirable low thermal expansion, it is proposed, further, that the material portion be designed in such a way that, from a plane in which the front surface of the spindle nose lies, the shortest distance in the sectional material to the material portion is no greater than 10 mm. The effect can be improved even further if the distance is <8 mm, if appropriate <5 mm or even better <3 mm.

BRIEF DESCRIPTION OF THE DRAWING

An exemplary embodiment of the invention is illustrated in a drawing and is explained in more detail below, with further advantages and particulars being given.

DETAILED DESCRIPTION OF THE INVENTION

Figure 1:
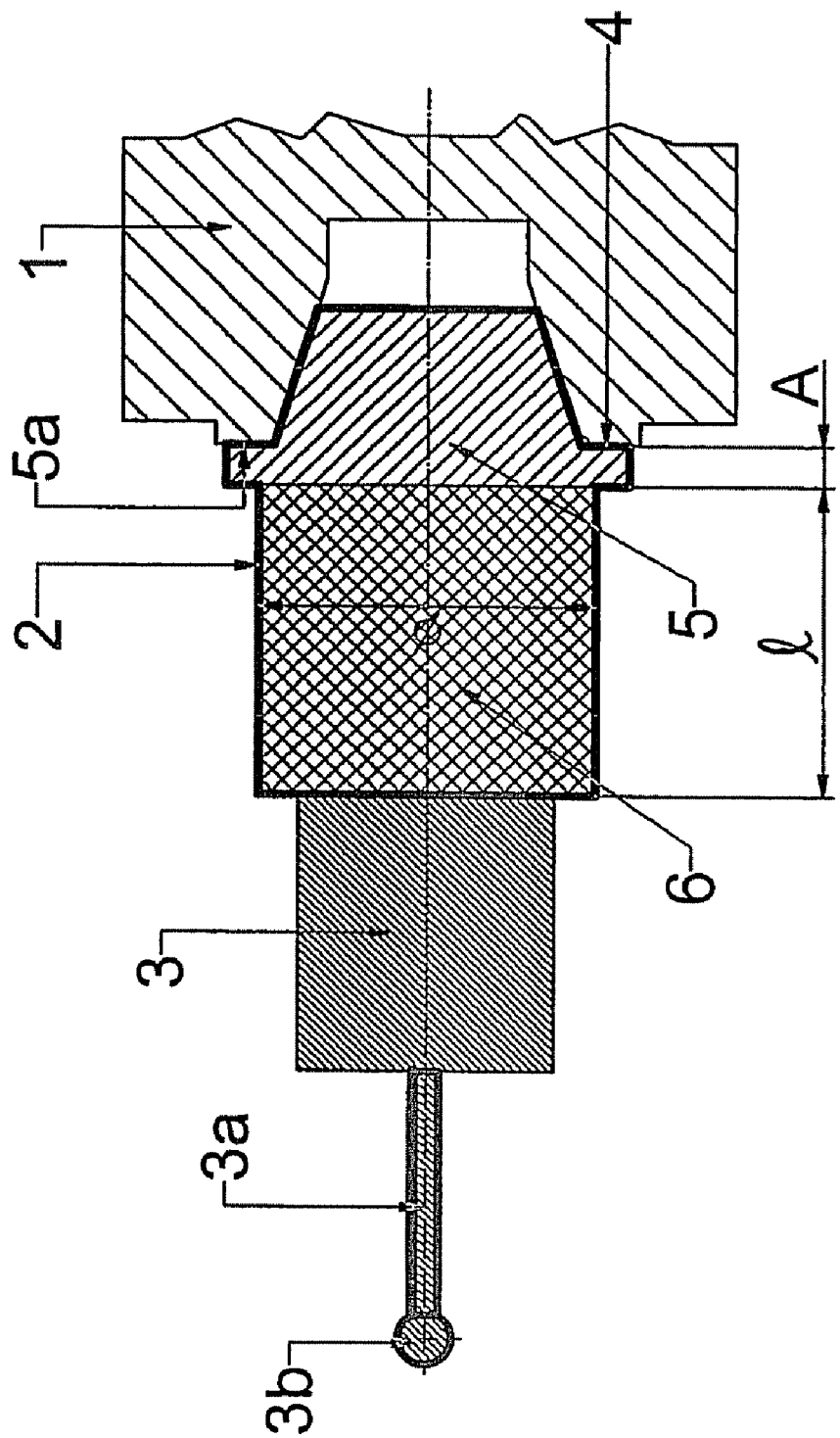
FIG. 1 shows a diagrammatic section through a tool holder with measuring sensor, inserted into a partially illustrated spindle holder.

FIG. 1 depicts the spindle 1 in which is seated a tool holder 2 with an interface 5 on which a measuring sensor 3 is arranged. The measuring sensor 3 possesses, for example, a measuring tip 3a with a spherical end 3b, for example a spherical ruby, for the accurate sensing of workpieces. The measuring tip 3a is preferably mounted in the measuring sensor 3 so as to be mechanically deflectable and with high accuracy and in a reproducible position.

A portion 6 of the tool holder 2 that is positioned between the measuring sensor 3 and a spindle nose 4 on the spindle 1 is made of a material which, as compared with the customary material of the tool holder 2, possesses a lower heat conductivity $\lambda$, and/or a lower coefficient of thermal expansion $\alpha$. In the exemplary embodiment, the spindle nose 4 at the same time forms a contact surface with planar bearing contacts 5a. The material portion 6 is at a distance "A" from the spindle nose 4 and extends over the complete cross section along a length "l". The distance "A" should be dimensioned so that, under the customary temperature conditions on a spindle, thermal expansion due to the introduction of heat into the material having the thickness "A" is no greater than 2 µm. The material portion 6 preferably possesses a coefficient of thermal expansion of <5 µm/mK °, even better a coefficient of thermal expansion of <2 µm/mK °. The heat conductivity is preferably <11 W/mK °.

Thus, an introduction of heat from the spindle 1 into the tool holder and a change in dimension due to an unpreventable introduction of heat can be forestalled to an extent such that, ultimately, a change in dimension of the tool holder from the spindle nose takes place only in an acceptable order of magnitude. Measurements can consequently be carried out with the desired accuracy by means of the measuring sensor 3 when it is inserted into the spindle 1 via the tool holder 2.

LIST OF REFERENCE SYMBOLS

1 Spindle
2 Tool holder
3 Measuring sensor
3a Measuring tip
3b Spherical end
4 Spindle nose
5 Interface
5a Contact surface
6 Material portion

We claim:

1. A tool holder for mounting a measuring sensor on a machine tool, with an interface to a spindle of a machine tool, the tool holder comprising, as seen from the interface for the spindle, a material portion which differs from the material of the remaining portion of the tool holder by having at least one of a lower coefficient of linear expansion $\alpha$ and a lower heat conductivity $\lambda$, wherein the material portion affords thermal decoupling between a tool-side portion of the tool holder with a tool received therein and the tool spindle to reduce a length change on account of an introduction of heat from the comparatively hot tool spindle,
wherein the material portion extends completely across the tool holder and divides the tool holder in axial length.

2. The tool holder as claimed in claim 1, wherein the material portion has at least one of a coefficient of linear expansion $\alpha$ of <5 µm/mK and a heat conductivity $\lambda$ of <11 W/mK.

3. The tool holder as claimed in claim 1, wherein, in the case of at least one continuous section through the tool holder transversely with respect to the tool holder axis, the material portion extends over more than 50% of a projected sectional plane in the axial direction.

4. The tool holder as claimed in claim 1, wherein the material portion extends over a predetermined axial length of the tool holder.

5. The tool holder as claimed in claim 1, wherein the material portion is located at a distance from a surface of contact of the interface with a spindle or from the surface of the tool holder such that the remaining portion of the tool holder has a thickness that is sufficient for providing a necessary stability for the tool holder.

6. The tool holder as claimed in claim 1, wherein the material portion is designed in such a way that, from a plane in which the front surface of the spindle nose lies, the shortest distance in the sectional material to the material portion is no greater than 10 mm.

7. A measuring sensor having a tool holder as claimed in claim 1.

* * * * *